(12) United States Patent
Yoshioka et al.

(10) Patent No.: US 8,476,351 B2
(45) Date of Patent: Jul. 2, 2013

(54) BLACK COMPOSITION, BLACK COATING COMPOSITION, RESIN BLACK MATRIX, COLOR FILTER FOR LIQUID CRYSTAL DISPLAY AND LIQUID CRYSTAL DISPLAY

(75) Inventors: Masahiro Yoshioka, Otsu (JP); Ryo Nagase, Otsu (JP); Masaya Tsujii, Otsu (JP); Masuichi Eguchi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 480 days.

(21) Appl. No.: 10/575,776

(22) PCT Filed: Oct. 14, 2004

(86) PCT No.: PCT/JP2004/015134
§ 371 (c)(1),
(2), (4) Date: Apr. 13, 2006

(87) PCT Pub. No.: WO2005/037926
PCT Pub. Date: Apr. 28, 2005

(65) Prior Publication Data
US 2007/0059612 A1 Mar. 15, 2007

(30) Foreign Application Priority Data
Oct. 15, 2003 (JP) .................................. 2003-354873

(51) Int. Cl.
C08K 3/10 (2006.01)
C08K 3/04 (2006.01)
C08F 8/00 (2006.01)

(52) U.S. Cl.
USPC ........... 524/413; 524/495; 524/496; 524/497; 525/100

(58) Field of Classification Search
USPC .... 525/100; 524/588, 495–497, 413; 556/400
See application file for complete search history.

(56) References Cited

U.S. PATENT DOCUMENTS

| | | | | |
|---|---|---|---|---|
| 4,162,244 | A * | 7/1979 | Bertram | 523/459 |
| 4,208,492 | A * | 6/1980 | Hedaya et al. | 525/389 |
| 5,786,042 | A | 7/1998 | Inoue et al. | |
| 5,880,799 | A | 3/1999 | Inoue et al. | |
| 6,582,862 | B1 * | 6/2003 | Nakamura et al. | 430/7 |
| 2002/0051106 | A1 * | 5/2002 | Nagashima et al. | 349/110 |
| 2002/0061969 | A1 * | 5/2002 | Shiono et al. | 525/100 |
| 2004/0236006 | A1 * | 11/2004 | Tanaka et al. | 524/543 |

FOREIGN PATENT DOCUMENTS

| | | |
|---|---|---|
| JP | 60-65069 A | 4/1985 |
| JP | 63-222007 A | 9/1988 |
| JP | 1-141963 A | 6/1989 |
| JP | 10-114836 A | 5/1998 |
| JP | 11-337722 A | 12/1999 |
| JP | 2000-66018 A | 3/2000 |
| JP | 2000-129146 A | 5/2000 |
| JP | 2000-143985 A | 5/2000 |
| JP | 2001-40292 A | 2/2001 |
| JP | 3196638 B2 | 6/2001 |
| JP | 3230800 B2 | 9/2001 |
| JP | 2002-267832 A | 9/2002 |
| JP | 2003-270428 A | 9/2003 |
| JP | 2003-287614 A | 10/2003 |
| WO | WO-95/35525 A1 | 12/1995 |

OTHER PUBLICATIONS

Translation of paragraph [0009]-[0011] of JP 2000-143985 (by Irina Knizhick on Aug. 11, 2011).*
Machine Translation of JP 09-015403.*

* cited by examiner

Primary Examiner — Hannah Pak
(74) Attorney, Agent, or Firm — Birch, Stewart, Kolasch & Birch, LLP

(57) ABSTRACT

A black coating composition which gives a highly adhesive resin black matrix that exhibits a high OD value which was able to be attained only by metal thin film black matrices is disclosed. The black coating composition comprises as indispensable components a titanium nitride oxide and a resin. The X-ray intensity ratios $R_1$ and $R_2$ of the titanium nitride oxide represented by the Equations (1) and (2) below, respectively, satisfy the relationships represented by Formulae (3) and (4) below:

$$R_1 = I_3/\{I_3 + 1.8(I_1 + 1.8I_2)\} \quad (1)$$

$$R_2 = I_2/I_1 \quad (2)$$

$$R_1 > 0.70 \quad (3)$$

$$0.85 < R_2 < 1.80 \quad (4)$$

wherein $I_1$ represents the maximum diffraction intensity of the titanium nitride oxide when the angle of diffraction $2\theta$, determined by using CuKα line as the X-ray source, is 25° to 26°, $I_2$ represents the maximum diffraction intensity of the titanium nitride oxide when the angle of diffraction $2\theta$ is 27° to 28°, and $I_3$ represents the maximum diffraction intensity of the titanium nitride oxide when the angle of diffraction $2\theta$ is 36° to 38°.

10 Claims, No Drawings

BLACK COMPOSITION, BLACK COATING COMPOSITION, RESIN BLACK MATRIX, COLOR FILTER FOR LIQUID CRYSTAL DISPLAY AND LIQUID CRYSTAL DISPLAY

TECHNICAL FIELD

The present invention relates to a black composition and black coating composition, and a resin black matrix utilizing the same, as well as to a color filter for liquid crystal displays and a liquid crystal display having the color filter.

Liquid crystal displays are apparatuses for displaying images and characters, and for carrying out information processing, utilizing electro-optical responses of liquid crystal, and are concretely used in personal computers, navigation systems, liquid crystal televisions, liquid crystal projectors and liquid crystal space modulation elements.

BACKGROUND ART

Liquid crystal displays have a structure in which a liquid crystal layer is sandwiched between a pair of substrates, and can express light and dark utilizing the electro-optical response caused by external electric field. They can also display colors by using color filters comprising pixels having color selectivity.

In liquid crystal displays, black matrix is used as a light shading film for shading the regions at which prevention of light transmittance is required, such as the regions between the pixels, and the regions carrying driving circuits. As the materials forming the light shading film, metallic materials having large extinction factors, such as chromium, nickel and aluminum, are used.

The light shading films made of these metals are usually formed by vapor deposition, sputtering or vacuum deposition, and the patterning of the formed light shade films is carried out by photolithography. In a typical method, the black matrix is formed by coating the metal thin film formed by the above-mentioned method with a photoresist, drying the coated photoresist, irradiating the dried photoresist with ultraviolet light through a photomask to form a resist pattern, etching the metal thin film and by peeling off the photoresist. The thus obtained black matrix made of a metal thin film has a film thickness of about 0.2 μm, and an optical density (OD value) of not less than 4.0. In color filters using the black matrix made of a metal thin film, the height of the surface steps after forming the red, green and blue pixels is as small as not more than 0.2 μm, so that the color filters have an advantage that formation of an over-coat for decreasing the height of the steps is not necessary. However, the production process of the black matrix made of a metal thin film is complicated so that the production cost is high. As a result, there is a problem in that the cost of the color filters is high accordingly. Further, with the liquid crystal displays having a black matrix made of a metal thin film, since the reflectance at the surface of the metal thin film is high, the reflected light is strong, so that the display quality is drastically degraded, which is problematic. To decrease the reflectance, a method has been proposed in which a metal oxide film is formed between the metal thin film and the substrate to form a bilayered or trilayered structure. However, even with this method, the problem of the production cost cannot be overcome.

On the other hand, as light shading agents, carbon black, titan black and the like have been used. The black matrix using the light shading agent such as carbon black or titan black is generally prepared by the following process:

First, a black composition comprising a light shading agent dispersed in a resin solution is prepared. Then the black composition is applied on a substrate, and patterning of the black composition is conducted by photolithography in the same manner as described above. The thus obtained black matrix has advantageous features that the production cost is low because the film is formed by the paste-coating method and the reflectance can be made lower than that of the metal light shading film. The "paste-coating method" herein means the method in which the composition (paste) is applied on a substrate and the composition is then patterned by photolithography. However, the OD value per a unit film thickness thereof is much lower than those made of the metal thin films described above, so that it is necessary to increase the concentration of the light shading agent contained in the film, or to increase the thickness of the film for securing the sufficient light shading property. However, increasing the concentration of the light shading agent causes a problem in that the adhesiveness of the film with the substrate is decreased because the polymer content is decreased. On the other hand, if the thickness of the film is increased, the height of the surface steps after forming the red, green and blue pixels is made large, so that formation of an over-coat on the red, green and blue pixels is necessary in order to decrease the height of the surface steps.

As a black matrix, resin black matrix comprising carbon black dispersed in a non-photosensitive polyimide resin is known (Patent Literature 1). This resin black matrix has an improved dispersion stability by using a carbon black having a defined amount of functional groups at its surface, and has an OD value per 1 μm of film thickness of 3.1 to 3.4.

A resin black matrix comprising titan black and a resin is also known (see Patent Literature 2). The OD value of this black matrix is 3.0 at a film thickness of 0.9 μm. Further, a resin black matrix comprising titanium nitride oxide and a resin is also known (see Patent Literature 3). This resin black matrix attains increase in the OD value by employing a titanium nitride oxide whose $R_1$ defined below is not less than 0.24. The maximum OD value of this resin black matrix per 1 μm of film thickness is 3.72.

$$R_1 = I_3 / \{I_3 + 1.8(I_1 + 1.8 I_2)\}$$

wherein $I_1$ represents the maximum diffraction intensity when the angle of diffraction 2θ is 25° to 26°;

$I_2$ represents the maximum diffraction intensity when the angle of diffraction 2θ is 27° to 28°; and $I_3$ represents the maximum diffraction intensity when the angle of diffraction 2θ is 36° to 38°.

The term "2θ" herein means the angle of diffraction of the titanium nitride oxide determined by using CuKα line as the X-ray source. A resin black matrix comprising titanic acid and a resin is known (Patent Literature 4). This resin black matrix has an increased OD value by using a titanium nitride oxide having a psychometric lightness L defined by Hunter's color difference equation of not more than 12.0 (The maximum OD value per 1 μm of film thickness is 4.0). A black radiosensitive resin composition comprising titan black is known (see Patent Literature 5). This resin black matrix has an OD value of 3.0 at a film thickness of 1.1 μm. A black pigment composition comprising a macromolecular compound and titan black is known (see Patent Literature 6). This resin black matrix has an OD value of 3.5 at a film thickness of 1.5 μm.

With any of the above-described known black matrices, the OD value per 1 μm of film thickness is not so high because the light shading property of the light shading agent used is not so high. Although a black matrix with which the OD value per 1 μm of film thickness is 4.0 is described as an example of the above-described resin black matrix comprising titanium nitride oxide and a resin, the concentration of the light shading agent in this resin black matrix is high (the weight ratio of the light shading agent to the resin is 70:30) in order to attain a high OD value. When the concentration of the light shading agent is high, the adhesion between the resin black matrix and the glass is not sufficient. There is also a problem in that a pattern of the resin black matrix cannot be formed in cases where the width of the pattern is small. This problem is even more serious in case of black radiosensitive resin compositions. That is, in addition to the problem in the adhesion, there is also a problem in that the edge portions have tapered shape or inverse tapered shape, and the vertical edge shape desired for the resin black matrix cannot be obtained.

In fact, with the color filters using a resin black matrix, the problem in that the adhesion of the resin black matrix is poorer than in the case of using metal thin film black matrix, that is, the problem in that the black matrix is peeled at the sealed portions, and the problem in that a narrow pattern having a width of not more than 10 μm cannot be formed have actually occurred.

Patent Literature 1: Japanese Patent No. 3196638 (pages 1 and 9-11, and Table 1)
Patent Literature 2: Japanese Laid-open Patent Application (Kokai) No. 2000-66018 (pages 2, 7-8)
Patent Literature 3: Japanese Laid-open Patent Application (Kokai) No. 2000-143985 (pages 2 and 5-7)
Patent Literature 4: Japanese Laid-open Patent Application (Kokai) No. 2001-40292 (pages 2 and 5-7)
Patent Literature 5: Japanese Patent No. 3230800 (pages 1 and 11)
Patent Literature 6: Japanese Laid-open Patent Application (Kokai) No. 10-114836 (pages 2 and 9-10)

DISCLOSURE OF THE INVENTION

Problems to be Solved by the Invention

In view of the above-described drawbacks of the prior art, an object of the present invention is to provide a black coating composition which gives a highly adhesive resin black matrix that exhibits a high OD value which was able to be attained only by metal thin film black matrices. By using such a black coating composition, a resin black matrix which is thin, which has a high OD value and which is highly adhesive is obtained. As a result, a color filter having no over-coat, which could be attained only by using a metal thin film black matrix, may be attained by using a resin black matrix.

To solve the problems in the prior art, the present inventors intensively studied to discover that the above-described object of the present invention may be attained by using a specific titanic nitride oxide described below is used as a light shading agent.

That is, the present invention provides a black composition comprising as indispensable components a titanium nitride oxide, a resin and a solvent; X-ray intensity ratios $R_1$ and $R_2$ represented by the Equations (1) and (2) below, respectively, satisfying the relationships represented by Formulae (3) and (4) below:

$$R_1 = I_3 / \{I_3 + 1.8(I_1 + 1.8I_2)\} \quad (1)$$

$$R_2 = I_2 / I_1 \quad (2)$$

$$R_1 > 0.70 \quad (3)$$

$$0.85 < R_2 < 1.80 \quad (4)$$

wherein $I_1$ represents the maximum diffraction intensity of the titanium nitride oxide when the angle of diffraction 2θ, determined by using CuKα line as the X-ray source, is 25° to 26°, $I_2$ represents the maximum diffraction intensity of the titanium nitride oxide when the angle of diffraction 2θ is 27° to 28°, and $I_3$ represents the maximum diffraction intensity of the titanium nitride oxide when the angle of diffraction 2θ is 36° to 38°.

The present invention also provides a black coating composition comprising as indispensable components a titanium nitride oxide and a resin; X-ray intensity ratios $R_1$ and $R_2$ represented by the Equations (1) and (2) below, respectively, satisfying the relationships represented by Formulae (3) and (4) below:

$$R_1 = I_3 / \{I_3 + 1.8(I_1 + 1.8I_2)\} \quad (1)$$

$$R_2 = I_2 / I_1 \quad (2)$$

$$R_1 > 0.70 \quad (3)$$

$$0.85 < R_2 < 1.80 \quad (4)$$

wherein $I_1$ represents the maximum diffraction intensity of the titanium nitride oxide when the angle of diffraction 2θ, determined by using CuKα line as the X-ray source, is 25° to 26°, $I_2$ represents the maximum diffraction intensity of the titanium nitride oxide when the angle of diffraction 2θ is 27° to 28°, and $I_3$ represents the maximum diffraction intensity of the titanium nitride oxide when the angle of diffraction 2θ is 36° to 38°

The present invention further provides a resin black matrix obtained from the black coating composition according to the present invention; a color filter for liquid crystal displays, which color filter comprises the above-described resin black matrix; and a liquid crystal display comprising the above-described color filter for liquid crystal displays.

Advantageous Effect of the Invention

By the present invention, a black coating composition which gives a highly adhesive resin black matrix that exhibits a high OD value which was able to be attained only by metal thin film black matrices may be obtained. Since the black composition according to the present invention can form a resin black matrix which is thin, which has a high OD value and which is highly adhesive, a color filter having no over-coat, which could be hitherto attained only by using a metal thin film black matrix, may be attained by using a resin black matrix. By virtue of the present invention, the necessity to form an over-coat is eliminated, so that the present invention will greatly contribute to the prevention of decrease in the yield and to cost reduction in the production of color filters.

BEST MODE FOR CARRYING OUT THE INVENTION

The black composition according to the present invention contains at least a light shading agent, a resin and a solvent. The black coating composition is in the form of a black thin film having light shading property, which is formed on a substrate, and contains titanium nitride oxide as an indispensable component.

The titanium nitride oxide used as the light shading agent in the present invention generally has a composition represented by the formula $TiN_xO_y$ (wherein $0<x<2.0$, $0.1<y<2.0$).

The present inventors intensively searched a titanium nitride oxide having a higher light shading property to discover that the titanium nitride oxide with which the X-ray intensity ratios $R_1$ and $R_2$ represented by the Equations (1) and (2) below, respectively, satisfy the relationships represented by Formulae (3) and (4) below:

$$R_1 = I_3/\{I_3 + 1.8(I_1 + 1.8I_2)\} \quad (1)$$

$$R_2 = I_2/I_1 \quad (2)$$

$$R_1 > 0.705 \quad (3)$$

$$0.85 < R_2 < 1.80 \quad (4)$$

wherein $I_1$, represents the maximum diffraction intensity of the titanium nitride oxide when the angle of diffraction $2\theta$, determined by using CuKα line as the X-ray source, is 25° to 26°, $I_2$ represents the maximum diffraction intensity when the angle of diffraction $2\theta$ is 27° to 28°, and $I_3$ represents the maximum diffraction intensity when the angle of diffraction $2\theta$ is 36° to 38°.

The above described Equation (1) is described in the above-mentioned Patent Literature 3 in which it is described that the larger the $R_1$, the higher the light shading property. However, the present inventors discovered that by optimizing the production conditions of the titanium nitride oxide taking the Equation (1) alone into consideration, $R_1$ cannot be made large with good reproducibility. Therefore, the present inventors intensively studied other parameters to discover that the above-described Equation (3) is satisfied with good reproducibility when the $R_2$ defined by the above-described Equation (2) satisfies the above-described Equation (4). By using the titanium nitride oxide satisfying the Equations (3) and (4) as the light shading agent, the resin black matrix according to the present invention may attain a high OD value while keeping a low concentration of the light shading agent in the black coating composition. As a result, the resin black matrix according to the present invention may secure a high adhesion. Further, since the resin black matrix according to the present invention has a high OD value per a unit film thickness, the practical OD value (3.5) is attained at a film thickness of not more than 0.8 μm. As a result, a color filter having a practically acceptable flatness may be attained even using a resin black matrix without using an over-coat.

Further, it was discovered surprisingly, that with a photosensitive black coating composition containing the titanium nitride oxide satisfying the Equations (3) and (4), in addition to the high OD value and good adhesion, a resin black matrix having vertical edge portions may be obtained. This is because that the curing of the film during the irradiation with light is easy to specifically proceed up to the lower portion of the film, in spite of the fact that the light hardly reaches the lower portion of the film due to the high OD value. Although the mechanism thereof has not yet been clarified, the present inventors presume that the radicals generated by the irradiation with light diffuse into the lower portion of the film because the titanium nitride oxide used in the present invention has the properties that (1) the transmittance of ultraviolet light (especially, i-ray (365 nm)) is higher than those of the usual light shading agents, and (2) its ability to trap the radicals generated by the irradiation with light is much lower than those of the usual light shading agents.

The X-ray intensity ratio $R_1$ is required to be more than 0.7, and is preferably not less than 0.80 because a higher OD value may be attained at the same concentration of the light shading agent. On the other hand, if the production is carried out under conditions under which the X-ray intensity ratio $R_1$ is too large, the X-ray intensity ratio $R_2$ becomes not more than 0.85. Therefore, the X-ray intensity ratio $R_1$ is preferably not more than 0.99.

The titanium nitride oxide having the above-described X-ray intensity ratios $R_1$ and $R_2$ may be produced by appropriately adjusting production parameters so that the X-ray intensity ratios $R_1$ and $R_2$ fall within the above-described ranges in known production processes of titanium nitride oxide, such as a process in which titanium dioxide or titanium hydroxide is reduced at a high temperature in the presence of ammonia (see Japanese Laid-open Patent Application (Kokai) Nos. 60-65069 and 61-201610); and (2) a process in which a vanadium compound is attached to titanium dioxide or titanium hydroxide, and reducing the resulting product at a high temperature in the presence of ammonia (see Japanese Laid-open Patent Application (Kokai) No.61-201610). For example, in the process (1) mentioned above, a titanium nitride oxide having the above-described X-ray intensity ratios $R_1$ and $R_2$ within the ranges defined above may be produced by adjusting the feed rate of the ammonia gas and the time period of the heat treatment. In general, there is a tendency that the higher the feed rate of the ammonia gas, the larger the $R_1$ and the smaller the $R_2$. Further, there is a tendency that the longer the heat treatment time, the larger the $R_1$ and the smaller the $R_2$. Thus, by adjusting these, a titanium nitride oxide having the above-described X-ray intensity ratios $R_1$ and $R_2$ within the ranges defined above may be produced. The feed rate of the ammonia gas may appropriately be about 5.5 cm/sec to 6.5 cm/sec in terms of in-furnace line velocity, and the heat treatment conditions may appropriately be at 800° C. to 850° C. for 8 to 9 hours, although the conditions are not restricted thereto. Concrete conditions for producing the titanium nitride oxide having the above-described X-ray intensity ratios $R_1$ and $R_2$ within the ranges defined above are described in Examples below.

The black coating composition according to the present invention preferably has an optical density (OD value) of not less than 4.4 per 1 μm of film thickness. This is because that if the OD value within the visible wavelength region between nm and 640 nm is not less than 4.4 at a film thickness of 1 μm, an OD value of not less than 3.5 is attained at a film thickness of 0.8 μm. The OD value is more preferably not less than 4.6. This is because that if the OD value is not less than 4.6, the film thickness at which the OD value is 3.5 may be made even smaller. The "OD value" herein means that calculated by the equation below using, for example, a microspectrophotometer (MCPD2000 manufactured by Otsuka Electronics Co., Ltd).

$$OD\ \text{Value} = \log_{10}(I_0/I)$$

(wherein $I_0$ represents the incident light intensity and I represents the transmitted light intensity).

The titanium nitride oxide used in the present invention preferably has a diameter of primary particle of not more than 100 nm, more preferably not more than 60 nm, still more preferably not more than 30 nm. As described below, the smaller the particle diameter, the more unlikely the precipitation occurs, so that smaller particle diameter is preferred. However, if the diameter of primary particle is less than 10 nm, aggregation is likely to occur during dispersion and a problem in that irregularities are formed on the surface of the resin black matrix, or the like may occur, which is not preferred. The diameter of primary particle may be determined by calculating arithmetic mean of the diameters observed with an electron microscope.

In the black composition according to the present invention, selection of the solvent is one of the important factors. The reason is that resides in the specific gravity of titanium nitride oxide. The specific gravity of titanium nitride oxide is between 4.2 and 4.8, and precipitation of titanium nitride oxide in the black composition containing titanium nitride oxide is problematic when the composition is stored for a long time. Methods for preventing the precipitation include a method in which the particle diameter of the titanium nitride oxide is made small, a method in which the viscosity of the black composition is made large, and a method in which the storing temperature is made as low as possible. In these three methods, the solvent largely influences on the viscosity of the black composition. That is, a solvent having a high viscosity may preferably be employed in order to increase the viscosity of the black composition. However, in general, a solvent having a high viscosity has a high boiling point. If the boiling point of the solvent is high, problems in that the drying is slow so that the production efficiency is decreased and that the solvent may be left in the black coating film formed from the black composition, and so on may occur.

In view of the above, it is preferred to use a solvent having a boiling point of 120° C. to 180° C., and a viscosity of 3 mPa·s to 10 mPa·s. If the boiling point is not higher than 120° C., the volatilization rate is too high so that various coating defects may be formed. If the boiling point is not lower than 180° C., problems in the rate of drying and the remaining of the solvent in the film occur. It should be noted, however, in cases where the curing temperature of the resin is sufficiently high, a solvent having a boiling point of not lower than 180° C. may also be used. On the other hand, if the viscosity is smaller than 3 mPa·s, precipitation of titanium nitride oxide cannot be prevented. If the viscosity is higher than 10 mPa·s, aggregation of titanium nitride oxide is likely to occur. Examples of the solvent having a boiling point of 120° C. to 180° C. and a viscosity of 3 mPa·s to 10 mPa·s include ethylene glycol butyl ether, 3-methoxy-3-methyl-1-butanol, propylene glycol-tert-butyl ether and mixtures thereof. The amount of the solvent to be used may appropriately be selected and is not restricted. Usually, the amount of the solvent is about 95 to 60% by weight, preferably about 90 to 70% by weight based on the entire black composition. The viscosity herein is the measured value at 25° C., and the measurement is carried out by using a cone-plate viscometer or the like.

As the resin to be used in the present invention, resins used in known black matrices may be employed, and either photosensitive or non-photosensitive resins may be employed. Preferred examples of the resins include epoxy resins, acrylic resins, siloxane polymer resins and polyimide resins. Since acrylic resins and polyimide resins are excellent in heat resistance, shelf stability and so on, they are preferably employed.

In most cases, acrylic resins are used in photosensitive resin compositions. In that case, the photosensitive resin composition at least comprises an acrylic resin, photo polymerizable monomer and a photoinitiator.

Examples of the acrylic resin include copolymers of a plurality of acrylate(s) and/or methacrylate(s) selected from the group consisting of alkyl acrylates and methacrylates such as acrylic acid, methacrylic acid, methyl acrylate and methyl methacrylate; cyclic acrylates and cyclic methacrylates; and acrylates and methacrylates having a functional group, such as hydroxyethyl acrylate and hydroxyethyl methacrylate. The acrylic resin may be a copolymer having other monomer(s) such as styrene, α-methylstyrene, acrylonitrile, itaconic acid esters and fumaric acid esters. It is preferred to use an acrylic resin having a weight average molecular weight of about 1000 to 200,000.

As the photo polymerizable monomer, a bifunctional, trifunctional or multifunctional monomer may be used. Examples of the bifunctional monomer include 1,6-hexanediol diacrylate, ethylene glycol diacrylate, neopentyl glycol diacrylate and triethylene glycol diacrylate, as well as acrylates containing (an) alicyclic structure(s), such as dicyclopentane diene, and acrylates containing (a) polycyclic aromatic ring(s) such as fluorene. Examples of the trifunctional monomer include trimethylolpropane triacrylate and pentaerythritol triacrylate; and examples of the multifunctional monomer include ditrimethylolpropane tetracrylate, dipentaerythritol penta- and hexaacrylates.

As the photoinitiator, benzophenone-, thioxanthone-, imidazole-, oxime- and/or triazine-based compounds may be used individually or in combination.

To the acrylic resin to be used in the present invention, (an) epoxy compound(s) and/or (an) epoxy curing agent(s) may be blended. The acrylic resin may contain epoxy group. By blending these, the solvent resistance and heat resistance of the black matrix may be improved.

Examples of the epoxy compound to be used include bisphenol A type epoxy compounds, bisphenol F type epoxy compounds, phenolic novolac epoxy compounds, cresol novolak epoxy compounds, trishydroxyphenyl methane-type epoxy compounds, alicyclic epoxy compounds, glycidyl ester-based epoxy compounds, glycidylamine-based epoxy compounds, heterocyclic epoxy compounds and fluorene-containing epoxy compounds.

As the curing agent, usual curing agents such as alcohols, phenols, amines, acid anhydrides, carboxylic acids and compounds having active hydrogen may be used. Cationic curing catalysts such as onium salts may also be used.

Polyimide resins which may preferably be used as the resin in the present invention are, in most cases, used as non-photosensitive resins, and are formed by ring closure imidization by heat of the precursor poly(amic-acid). The poly(amic-acid) usually has the structural unit represented by the Formula (5) below as a major constituent.

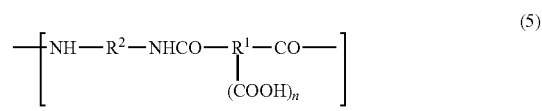

(5)

In the above Formula (5), n represents an integer of 1 to 4. $R^1$ represents an acid component residue and is a trivalent or tetravalent organic group having at least two carbon atoms. From the viewpoint of heat resistance, $R^1$ is preferably a $C_6$-$C_{30}$ trivalent or tetravalent group containing (a) cyclic hydrocarbon(s), aromatic ring(s) or aromatic heterocyclic ring(s). Examples of $R^1$ include, but not limited to, groups derived from phenyl, biphenyl, terphenyl, naphthalene, perylene, diphenyl ether, diphenyl sulfone, diphenylpropane, benzophenone, biphenyl trifluoropropane, cyclobutyl, cyclopentyl group or the like. $R^2$ represents a divalent organic group having at least two carbon atoms. From the viewpoint of heat resistance, $R^2$ is preferably a $C_6$-$C_{30}$ divalent group containing (a) cyclic hydrocarbon(s), aromatic ring(s) or aromatic heterocyclic ring(s). Examples of $R_2$ include, but not limited to, groups derived from phenyl, biphenyl, terphenyl, naphthalene, perylene, diphenyl ether, diphenyl sulfone, diphenylpropane, benzophenone, biphenyl trifluoropropane, diphenylmethane, cyclohexylmethane group or the like. The polymer containing the structural unit represented by the above-described Formula (5) as the major component may be one in which each of $R^1$ and $R^2$ is a single type of group, or may be a copolymer containing two or more types of groups as $R^1$ and $R^2$, respectively.

In cases where either the acrylic resin or the polyimide resin is used, an adhesion promotor may be added to the black composition. As the adhesion promotor, silane coupling agents and titan coupling agents may be used.

In the present invention, as the adhesion promotor, an organoalkoxysilane hydrolysis condensate may preferably be used. The organoalkoxysilane is a compound represented by the following Formula (6):

$$R^1{}_n Si(OR^2)_{4-n} \qquad (6)$$

(wherein $R^1$ is an organic group selected from the group consisting of alkyl (preferably $C_1$-$C_4$, especially $C_1$ or $C_2$), vinyl, phenyl and γ-glycidoxypropyl; $R^2$ is hydrogen or an organic group selected from alkyl; and n represents an integer of 1 to 3). Specific examples thereof include, but not limited to, methyltrimethoxysilane, dimethyldimethoxysilane, trimethylmethoxysilane, methyltriethoxysilane, dimethyldiethoxysilane, trimethylethoxysilane, vinyltrimethoxysilane, divinyldimethoxysilane, vinyltriethoxysilane, divinyldiethoxysilane, phenyltrimethoxysilane, diphenyldimethoxysilane, phenyltriethoxysilane, diphenyldiethoxysilane, γ-glycidoxypropyltrimethoxysilane, γ-glycidoxypropyltriethoxysilane, γ-glycidoxypropyldimethoxysilane and γ-glycidoxypropylmethyldiethoxysilane. These organoalkoxysilanes may be used individually, or two or more of these may be used in combination. Although these organoalkoxysilanes may be used as they are, hydrolysate and hydrolysis condensate thereof may also be used. Hydrolysis may be carried out by adding water to the organoalkoxysilane and allowing the mixture to react at a low temperature. Hydrolysis condensation may be carried out by adding water to the organoalkoxysilane, heating the resulting mixture and distilling off water and alcohol. For the hydrolysis and hydrolysis condensation, an acid catalyst may be added. It is not preferred, however, to use the organoalkoxysilane as it is because it is unstable to moisture and is highly reactive. It is not preferred to use an organoalkoxysilane hydrolysate in the black composition because low-boiling components such as water and alcohol may remain in the black composition, which may cause coating defects. From these viewpoints, it is most preferred to use a hydrolysis condensate in the present invention.

In the present invention, as an adhesion promotor, a compound having a siloxane bond and a carbon-carbon double bond in a single molecule and having no silanol group may be used. This compound exerts adhesion with glass substrate at its siloxane moiety, and binds to the resin through the carbon-carbon double bond, thereby improving the adhesion between the black coating film and the glass substrate. Further, since this compound does not have an active silanol group, it does not bring about a problem such as deterioration of shelf stability of the black composition or the generation of residues during the patterning. This compound is represented by the Formula (7) below, and specific examples thereof include a reaction product of bis-3-(aminopropyl)tetramethylsiloxane and 4 times equivalents of glycidyl methacrylate.

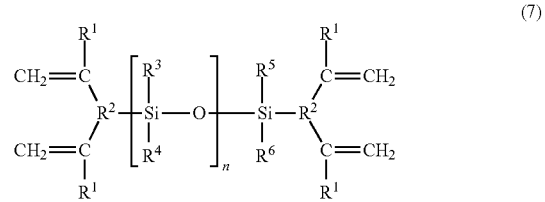

(7)

(wherein each $R^1$ independently represents hydrogen or alkyl group (preferably $C_1$-$C_4$); each $R^2$ independently represents an organic group containing amide bond, imide bond, ester bond or urethane bond; $R^3$ to $R^6$ independently represent alkyl group (preferably $C_1$-$C_4$); and n represents an integer of 1 to 3.)

Preferred examples of $R_2$ include the following organic groups:

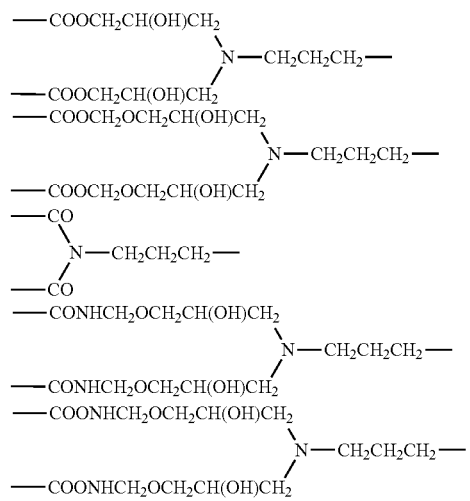

In the above formulae, propylene group (—$CH_2CH_2CH_2$—) may also preferably be another $C_1$-$C_6$ alkylene group, and hydroxypropylene group (—$CH_2CH(OH)CH_2$—) may also preferably be another $C_1$-$C_6$ hydroxyalkylene group.

The above-described adhesion promoters may be used individually or two or more of them may be used in combination. Although the amount of the adhesion promotor to be used may appropriately be selected and is not restricted, it is usually about 0.1 to 10% by weight based on the entire black composition.

In the black composition according to the present invention, the weight ratio of titanium nitride oxide/resin is preferably within the range between 75/25 and 60/40 in order to obtain a black coating film having a high resistance and high OD value. The weight ratio of titanium nitride oxide/resin is more preferably within the range between 73/27 and 65/35 from the viewpoint of the balance of adhesion, ease of patterning and OD value. If the weight ratio is more than 75/25, adhesion and ease of patterning of the black coating film are deteriorated because the content of titanium nitride oxide is too high. On the other hand, if the weight ratio is less than 60/40, the OD value sharply decreases, and the aimed OD value of not less than 4.4 at a film thickness of 1 μm may not be attained. It should be noted, however, that a part of the titanium nitride oxide may be replaced with other pigment(s) to the extent that the OD value is not decreased.

By using carbon black as the other pigment, the decrease of OD value of the black coating film may be minimized, while the resistance and color of the black coating film may be adjusted. That is, since titanium nitride oxide has a high resistance while carbon black has a low resistance, the resistance of the black coating film may be controlled by controlling the mixing ratio of these materials. Further, by using surface-treated carbon black as the carbon black, more freedom in the control of the resistance may be given. On the other hand, as for the color, since the transmitted color through titanium nitride oxide is blue while that through carbon black is red, neutral black may be obtained by mixing these materials. Further, surprisingly, by using a carbon black whose surface is treated with an acid, a new advantageous effect that the development margin is increased, that is, resolution is not decreased even if the developing time is extended. Although the mechanism thereof has not yet been clarified, this effect is presumably obtained by the combination of titanium nitride oxide having a basic surface and carbon black having an acidic surface. In case of using carbon black, the content may appropriately be selected, and is usually about 5 to 20% based on the weight of titanium nitride oxide, although the content is not restricted thereto.

The black coating film obtained from the black composition according to the present invention has advantageous features that it has a high OD value and good adhesion. In spite of the fact that the light hardly reaches the lower portion of the film due to the high OD value, since the curing of the film during irradiation with light is easy to specifically proceed up to the lower portion of the film, a resin black matrix having vertical edge portions may be obtained. Although the mechanism thereof has not yet been clarified, it is presumed that the radicals generated by the irradiation with light diffuse into the lower portion of the film because the titanium nitride oxide used in the present invention has the properties that (1) the transmittance of ultraviolet light (especially, i-ray (365 nm)) is higher than those of the usual light shading agents, and (2) its ability to trap the radicals generated by the irradiation with light is much lower than those of the usual light shading agents. Since the black coating film obtained from the black composition according to the present invention has such advantageous features, the black coating film is of high OD value and high sensitivity such that the OD value per 1 μm of film thickness is not less than 4.4, and the minimum exposure energy required for photo-curing is not more than 60 mJ/cm$^2$. The exposure energy herein means the intensity of i-ray (365 nm) radiated to a substrate from the light source of an exposure apparatus.

In the present invention, this black coating film is used as the resin black matrix. In general, in the production processes of resin black matrix, a coating composition is applied on a substrate by dipping method, roll coater method, spinner method, die coating method, wire bar method or the like, and the coated composition is dried under heat and cured, thereby obtaining a coating film. The conditions of the heat treatment vary depending on the resin and solvent used and on the amount of the coated composition, the heat treatment may preferably be carried out usually at 50° C. to 400° C. for 1 to 300 minutes.

The thus obtained coating film is then patterned usually using photolithography or the like. That is, the coating film is then exposed and developed into a desired pattern after forming a coating photoresist film thereon in cases where the resin is a non-photosensitive resin, or as it is or after forming an oxygen-impermeable film thereon in cases where the resin is a photosensitive resin. Thereafter, as required, the photoresist or the oxygen-impermeable film is removed, and the coating composition is cured by heating. Although the heat curing conditions vary depending on the resin, in case of an acrylic resin, the heat treatment is usually carried out at 200° C. to 250° C. for 1 to 60 minutes, and in case of a polyimide resin, the heat treatment is usually carried out at 200° C. to 350° C. for 1 minute to 60 minutes.

The thus obtained resin black matrix retains good adhesion, and the film thickness at which the OD value (not less than 3.5) required for color filters for liquid crystal displays is attained is not more than 0.8 μm. In cases where the film thickness at which an OD value of 3.5 is attained is larger than 0.8 μm, the height of the surface steps on the color filter is large, so that it is necessary to form an over-coat on the pixels to as to reduce the height of the surface steps to 0.3 μm. As a result, the yield of the color filter is decreased, and the cost is increased. On the other hand, if the film thickness is made to be not more than 0.8 μm, the OD value of the coating film is not more than 3.5, so that the contrast of the display when the liquid crystal is driven is decreased, and so the display quality is drastically decreased. Further, since light is not sufficiently shaded by the black matrix, the thin film transistors may erroneously operated when light impinges on the thin-film transistors formed in the liquid display apparatus.

The resin black matrix according to the present invention comprises as indispensable components a titanium nitride oxide and a resin, wherein X-ray intensity ratios $R_1$ and $R_2$ represented by the Equations (1) and (2) below, respectively, satisfy the relationships represented by Formulae (3) and (4) below:

$$R_1 = I_3/\{I_3 + 1.8(I_1 + 1.8 I_2)\} \tag{1}$$

$$R_2 = I_2/I_1 \tag{2}$$

$$R_1 > 0.70 \tag{3}$$

$$0.85 < R_2 < 1.80 \tag{4}$$

wherein $I_1$ represents the maximum diffraction intensity of the titanium nitride oxide when the angle of diffraction 2θ, determined by using CuKα line as the X-ray source, is 25° to 26°, $I_2$ represents the maximum diffraction intensity of the titanium nitride oxide when the angle of diffraction 2θ is 27° to 28°, and $I_3$ represents the maximum diffraction intensity of the titanium nitride oxide when the angle of diffraction 2θ is 36° to 38°.

By using the above-described titanium nitride oxide, the resin black matrix according to the present invention has an OD value of not less than 4.4 per 1 μm of film thickness.

Further, since the transmittance of ultraviolet light (especially, i-ray (365 nm)) through the titanium nitride oxide used in the present invention is higher than those of the usual light shading agents, the transmittance of i-ray through the resin black matrix according to the present invention is more than 0.2% when the OD value is 2.0. The transmittance of i-ray when the OD value is 2.0 may be calculated approximately by proportional calculation based on the measured OD value and i-ray transmittance of the resin black matrix. The OD value may be calculated using a microspectrophotometer (MCPD2000 manufactured by Otsuka Electronics Co., Ltd) as mentioned above, and the i-ray transmittance may be measured with an ultraviolet and visible spectrophotometer. According to the present invention, a color filter for liquid crystal displays may be produced using the resin black matrix. In case of using the resin black matrix according to the present invention in the production of the color filter for liquid crystal displays, the black matrix is coated on a transparent substrate, then pixels having color selectivities of red, green and blue, respectively, are formed, and then an over-coat is formed thereon as required, as described in Japanese Patent Publication (Kokoku) No. 2-1311. Concrete materials of the pixels include inorganic films whose film thickness is so controlled as to allow transmission of an specified light alone, and colored resin films which are dyed or in which a dye or pigment is dispersed. The order of forming the pixels may be changed optionally as required.

Although the pigments which may be used for the pixels of the color filter according to the present invention are not restricted, pigments having excellent heat resistance and chemical resistance are desired. Specific examples of representative pigments include Pigment Red (PR—) 2, 3, 22, 38, 149, 166, 168, 177, 206, 207, 209, 224, 242 and 254; Pigment Orange (PO—) 5, 13, 17, 31, 36, 38, 40, 42, 43, 51, 55, 59, 61, 64, 65 and 71; Pigment Yellow (PY—) 12, 13, 14, 17, 20, 24, 83, 86, 93, 94, 109, 110, 117, 125, 137, 138, 139, 147, 148, 150, 153, 154, 166, 173 and 185; Pigment Blue (PB—) 15 (15:1, 15:2, 15:3, 15:4, 15:6), 21, 22, 60 and 64; and Pigment Violet (PV—) 19, 23, 29, 32, 33, 36, 37, 38, 40 and 50. In the present invention, the pigments are not restricted thereto, and various pigments may be used.

As the above-mentioned pigments, those of which surfaces have been subjected to surface treatments such as treatments with rosin, acidic groups, basic groups or pigment derivatives may be employed.

The symbols PR (Pigment Red), PY (Pigment Yellow), PV (Pigment Violet), PO (pigment orange) and so on are symbols of color index (C.I.; published by The Society of Dyers and Colourists"), and, formally, the symbol "C.I." is attached to the head of the each symbol (e.g., C.I. PR254 and the like). These identifications define the standards of pigments and dyeing, and each symbol identify the specific standard pigment and its color. In the description of the present invention, the above-mentioned symbol "C.I." is omitted, in principle (for example, "C.I. PR254" is referred to as "PR254").

The resins which may be used as the colored resin films are not restricted, and either photosensitive or non-photosensitive resins may be employed. Concretely, epoxy resins, acrylic resins, siloxane polymer resins, polyimide resins and the like are preferably employed. From the viewpoint of simplicity of the production process, heat resistance, light resistance and the like, it is preferred to use colored resin films in which pigments are dispersed. From the viewpoint of ease of forming patterns, it is preferred to use a photosensitive acrylic resin in which a pigment is dispersed. From the viewpoint of heat resistance and chemical resistance, it is preferred to use a polyimide resin in which a pigment is dispersed.

In the color filter according to the present invention, a transparent electroconductive film may be formed as required after forming the color layers of three primary colors. As the transparent electrode, oxide thin films such as ITO (indium tin oxide) are preferably employed. Usually, ITO film with a thickness of about 0.1 µm is formed by sputtering method or vacuum deposition method. An example of preparing the color filter according to the present invention will now be described.

First, black matrix is formed on a non-alkali glass plate using poly(amic-acid) and titanium nitride oxide. Then a blue color layer is formed such that it embeds the apertural areas in the black matrix. In the same manner, red color layer is formed in the apertural areas in the black matrix, and then green color layer is formed in the apertural areas in the black matrix. Then a transparent electroconductive film is laminated thereon, thereby completing the color filter according to the present invention.

An example of liquid crystal display apparatuses using the color filter will now be described. The color filter and an electrode substrate, each on which a liquid crystal alignment layer subjected to rubbing treatment for aligning liquid crystal is formed, are faced and laminated through spacers for retaining cell gap. On the electrode substrate, thin-film transistor (TFT) elements or thin-film diode (TFD) elements, scanning line, data line and so on may be formed to prepare a TFT liquid crystal display or TFD liquid crystal display. Then liquid crystal is injected from an injection port formed at the sealing region, and then the injection port is sealed. Then an IC driver and the like are mounted, thereby completing the liquid crystal display.

EXAMPLES

The present invention will now be described concretely based on the examples thereof. However, the present invention is not limited to the examples.

Example 1

Titanium dioxide powder (4.0 kg) having an average diameter of primary particle of 40 nm was fed to a reaction furnace and then ammonia gas was flown in the furnace at a linear velocity of 6 cm/sec, followed by carrying out reaction at a furnace temperature of 850° C. for 9 hours to obtain titanium nitride oxide A (3.2 kg). The diffraction spectrum of the powdery titanium nitride oxide A as a light shading agent was measured with an X-ray diffractometer manufactured by Rigaku Corporation. As a result, the $I_1$, $I_2$, and $I_3$ were 36 cps, 36 cps and 818 cps, respectively, the X-ray intensity ratio $R_1$, was 0.82 and the X-ray intensity ratio $R_2$ was 1.00.

In γ-butyrolactone solvent (3825 g), pyromellitic dianhydride (149.6 g), benzophenone tetracarboxylic dianhydride (225.5 g), 3,3'-diaminodiphenyl sulfone (69.5 g), 4,4'-diaminodiphenyl ether (210.2 g) and bis-3-(aminopropyl)tetramethylsiloxane (17.4 g) were reacted at 60° C. for 3 hours. Maleic anhydride (2.25 g) was added, and the resulting mixture was allowed to react at 60° C. for another 1 hour to obtain a poly(amic-acid) solution (polymer concentration: 15% by weight) as a precursor.

A mixture of 11.2 g of the above-described titanium nitride oxide A, 18.7 g of the above-described poly(amic-acid) solution having a polymer concentration of 15% by weight, 57.2 g of N-methyl-2-pyrrolidone and 12.9 g of 3-methyl-3-methoxybutyl acetate was subjected to dispersion treatment together with 100 g of glass beads using a homogenizer at 7000 rpm for 30 minutes, and then the glass beads were removed by filtration to obtain a dispersion liquid having a solid content of 14% by weight. To 27.5 g of this dispersion liquid, 5.9 g of the above-described poly(amic-acid) solution having a polymer concentration of 15% by weight, 1.0 g of γ-butyrolactone, 6.0 g of N-methyl-2-pyrrolidone and 1.8 g of 3-methyl-3-methoxybutyl acetate were added to prepare a black composition. The thus obtained black composition was applied to a non-alkali glass substrate, and the composition was prebaked at 145° C. to form a polyimide precursor black coating film. The thus obtained black coating film was heated to 290° C. to carry out heat curing to convert the poly(amic-acid) to polyimide, thereby forming a light shading film for resin black matrix. The weight ratio of titanium nitride oxide/polyimide resin was 65/35. The obtained light shading film for resin black matrix had a film thickness of 0.8 µm and an OD value of 3.60. The obtained light shading film for resin black matrix was subjected to cross-cut peeling test by adhesion tape in accordance with JIS K 5600, and peeling was not observed at all.

Example 2

Titanium dioxide powder (4.0 kg) having an average diameter of primary particle of 50 nm was fed to a reaction furnace and then ammonia gas was flown in the furnace at a linear velocity of 5.5 cm/sec, followed by carrying out reaction at a furnace temperature of 850° C. for 8 hours to obtain titanium nitride oxide B (3.1 kg). The diffraction spectrum of the powdery titanium nitride oxide B was measured with an X-ray diffractometer manufactured by Rigaku Corporation. As a result, the $I_1$, $I_2$ and $I_3$ were 41 cps, 73 cps and 775 cps, respectively, the X-ray intensity ratio $R_1$ was 0.71 and the X-ray intensity ratio $R_2$ was 1.78. The same procedure as in Example 1 was carried out except that the titanium nitride oxide B was used as a light shading agent to form a light shading film for resin black matrix. The obtained light shading film for resin black matrix had a film thickness of 0.8 μm and an OD value of 3.51. The obtained light shading film for resin black matrix was subjected to cross-cut peeling test by adhesion tape in the same manner as in Example 1, and peeling was not observed at all.

Example 3

Titanium dioxide powder (4.0 kg) having an average diameter of primary particle of 45 nm was fed to a reaction furnace and then ammonia gas was flown in the furnace at a linear velocity of 6.5 cm/sec, followed by carrying out reaction at a furnace temperature of 800° C. for 8 hours to obtain titanium nitride oxide C (3.2 kg). The diffraction spectrum of the powdery titanium nitride oxide C was measured with an X-ray diffractometer manufactured by Rigaku Corporation. As a result, the $I_1$, $I_2$ and $I_3$ were 49 cps, 42 cps and 802 cps, respectively, the X-ray intensity ratio $R_1$ was 0.78 and the X-ray intensity ratio $R_2$ was 0.86. The same procedure as in Example 1 was carried out except that the titanium nitride oxide C was used as a light shading agent to form a light shading film for resin black matrix. The obtained light shading film for resin black matrix had a film thickness of 0.8 μm and an OD value of 3.55. The obtained light shading film for resin black matrix was subjected to cross-cut peeling test by adhesion tape in the same manner as in Example 1, and peeling was not observed at all.

Example 4

The same procedure as in Example 1 was carried out except that the acrylic resin solution described below was used in place of the poly(amic-acid) solution, and that the prebaking and the baking were conducted at temperatures of 120° C. and 220° C., respectively, to form a light shading film for resin black matrix. The exposure energy was 200 mJ/cm$^2$ using i-ray. The mixture of acrylic copolymer solution (Cyclomer-P (registered trademark), ACA-250, manufactured by Daicel Chemical Industries, Ltd.), pentaerythritol tetramethacrylate, a photoinitiator Irgacure (registered trademark) 369 (manufactured by Ciba Specialty Chemicals K.K.) and propylene glycol monomethyl ether acetate was used as the acrylic resin solution. The weight ratio of titanium nitride oxide/(acrylic copolymer+pentaerythritol tetramethacrylate) was 65/35. The obtained light shading film for resin black matrix had a film thickness of 0.8 μm and an OD value of 3.60. The obtained light shading film for resin black matrix was subjected to cross-cut peeling test by adhesion tape in the same manner as in Example 1, and peeling was not observed at all.

Example 5

The same procedure as in Example 4 was carried out except that propylene glycol-t-butyl ether (boiling point: 153° C., viscosity: 3.4 mPa·s) was used in place of propylene glycol monomethyl ether to prepare a black composition and to form a black coating film. The black coating film had a film thickness of 0.8 μm and an OD value of 3.60. The obtained black coating film was subjected to cross-cut peeling test by adhesion tape in the same manner as in Example 1, and peeling was not observed at all. Further, after leaving the black composition to stand at 5° C. for 2 months, the upper portion of the black composition was carefully collected and used to form a black coating film in the same manner as in Example 4. The film had a thickness of 0.8 μm and an OD value of 3.60. No change was observed in the relationship between the film thickness and the OD value, indicating that the sedimentation of titanium nitride oxide particles had not occurred.

Comparative Example 1

Titanium dioxide powder (4.0 kg) having an average diameter of primary particle of 40 nm was fed to a reaction furnace and then ammonia gas was flown in the furnace at a linear velocity of 4.0 cm/sec, followed by carrying out reaction at a furnace temperature of 800° C. for 6 hours to obtain titanium nitride oxide D (3.0 kg). The diffraction spectrum of the powdery titanium nitride oxide D was measured with an X-ray diffractometer manufactured by Rigaku Corporation. As a result, the $I_1$, $I_2$ and $I_3$ were 77 cps, 65 cps and 790 cps, respectively, the X-ray intensity ratio $R_1$ was 0.69 and the X-ray intensity ratio $R_2$ was 0.84. The same procedure as in Example 1 was carried out except that the titanium nitride oxide D was used as a light shading agent to form a light shading film for resin black matrix. The obtained light shading film for resin black matrix had a film thickness of 0.8 μm and an OD value of 3.3. In the case where the OD value was 3.5, the film thickness was 0.85 μm. The obtained light shading film for resin black matrix was subjected to cross-cut peeling test by adhesion tape in the same manner as in Example 1, and peeling was not observed at all.

Comparative Example 2

Titanium dioxide powder (4.0 kg) having an average diameter of primary particle of 50 nm was fed to a reaction furnace and then ammonia gas was flown in the furnace at a linear velocity of 3.5 cm/sec, followed by carrying out reaction at a furnace temperature of 800° C. for 6 hours to obtain titanium nitride oxide E (2.9 kg). The diffraction spectrum of the powdery titanium nitride oxide E was measured with an X-ray diffractometer manufactured by Rigaku Corporation. As a result, the $I_1$, $I_2$ and $I_3$ were 60 cps, 112 cps and 745 cps, respectively, the X-ray intensity ratio $R_1$ was 0.61 and the X-ray intensity ratio $R_2$ was 1.81. The same procedure as in Example 1 was carried out except that the titanium nitride oxide E was used as a light shading agent to form a light shading film for resin black matrix. The obtained light shading film for resin black matrix had a film thickness of 0.8 μm and an OD value of 3.0. In the case where the OD value was 3.5, the film thickness was 0.93 μm. The obtained light shading film for resin black matrix was subjected to cross-cut peeling test by adhesion tape in the same manner as in Example 1, and peeling was not observed at all.

Example 6

The same procedure as in Example 4 was carried out except that the organoalkoxysilane hydrolysis condensate was added to form a black coating film. The organoalkoxysilane hydrolysis condensate used herein was prepared as described below. The condensation product was added to a black composition in an amount of 1% by weight based on the acrylic resin.

A mixture of 24.0 g of phenyltrimethoxysilane, 258.8 g of methyltrimethoxysilane, 108.12 g of water and 336.0 g of propylene glycol monomethyl ether acetate was prepared, and reacted at 110° C. for 2 hours to obtain a organoalkoxysilane hydrolysis condensate. Methanol and water generated during the reaction were distilled off.

The thus obtained black coating film had a film thickness of 0.8 µm and an OD value of 3.55. The black coating film was subjected to cross-cut peeling test by adhesion tape in the same manner as in Example 1, and peeling was not observed at all. Further, the black coating film formed on a glass substrate was kept for 3 hours under the condition of pressure cooker test (PCT) at 121° C. under 2 atm, and thereafter the black coating film was subjected to cross-cut peeling test by adhesion tape. As a result, peeling was not observed at all.

Example 7

The same procedure as in Example 4 was carried out except that the reaction product between bis-3-(aminopropyl)tetramethylsiloxane and 4 equivalents of glycidyl methacrylate was added to form a black coating film. The reaction product was prepared as described below. The reactant was added to a black composition in an amount of 1% by weight based on the acrylic resin.

A mixture of 49.6 g of bis-3-(aminopropyl)tetramethylsiloxane, 113.72 g of glycidyl methacrylate and 0.1 g of hydroquinone was prepared and reacted at 50° C. for 2 hours. To the resulting mixture, 163.32 g of propylene glycol monomethyl ether acetate was added, and reacted for another 2 hours at 50° C., thereby obtaining the reaction product mentioned above.

The thus obtained black coating film had a film thickness of 0.8 µm and an OD value of 3.55. The black coating film was subjected to cross-cut peeling test by adhesion tape in the same manner as in Example 1, and peeling was not observed at all. Further, the black coating film formed on a glass substrate was kept for 3 hours under the condition of pressure cooker test (PCT) at 121° C. under a pressure of 2 atm, and thereafter the black coating film was subjected to cross-cut peeling test by adhesion tape. As a result, peeling was not observed at all.

Example 8

The same procedure as in Example 4 was carried out except that CGI242 (manufactured by Ciba Specialty Chemicals K.K.) was used as a photoinitiator to prepare a black composition. The obtained black composition was applied to a substrate at a film thickness after postbaking of 0.8 µm, and then prebaking was carried out as in Example 4.

The obtained black coating film was exposed to lights at varying light exposure energies within the range of 30 mJ/cm$^2$ to 210 mJ/cm$^2$ at intervals of every 20 mJ/cm$^2$ and then each substrate was immersed in 0.04 wt % aqueous potassium hydroxide solution for 120 seconds, followed by postbaking as in Example 4 after washing with water, thereby obtaining a black coating film. The regions of the obtained black coating film, at which the exposure energy was not less than 50 mJ/cm$^2$, had a thickness of 0.8 µm. Thus, it was confirmed that the minimum exposure energy required for the photo-curing was 50 mJ/cm$^2$. On the other hand, additional 5 substrates were prepared, each of which was coated with the prebaked black composition, by following the procedure in Example 4 until the prebaking step, and then exposing the substrates through a photomask having line-and-space patterns with widths of 1, 2, 3, 5, 6, 10, 15, 20, 30 and 50 µm, respectively. The obtained substrates were immersed in 0.04 wt % potassium hydroxide solution for varying period of time. As a result, it was proved that coating films having a line-and-space pattern of not less than 6 µm could be obtained within the range of immersion time between 90 seconds and 130 seconds.

Example 9

The same procedure as in Example 8 was carried out except that the mixture of titanium nitride oxide A obtained in Example 1 and an acidic carbon black in the ratio of 50/50 (in weight) was used as a light shading agent, and that the exposure energy for preparing a coating film having a line-and-space pattern was 60 mJ/cm$^2$, to obtain a black composition, black coating film and a coating film having a line-and-space pattern. The regions of the obtained black coating film, at which the exposure energy was not less than 80 mJ/cm$^2$, had a thickness of 0.8 µm. Thus, it was confirmed that the minimum exposure energy required for the photo-curing was 60 mJ/cm$^2$. By observing the black coating film by holding it up to a fluorescent lamp, it was confirmed that the black coating film had a black color without coloration. Further, the obtained coating films having a line-and-space pattern had a line-and-space pattern with a width of not less than 5 µm within the range of immersion time between 90 seconds and 150 seconds. That is, it was confirmed that the black composition obtained herein had higher resolution and wider development margin than that obtained in Example 8, which was prepared using titanium nitride oxide alone.

Comparative Example 3

The same procedure as in Example 8 was carried out except that acidic carbon black alone was used as a light shading agent, and that the exposure energy for preparing a coating film having a line-and-space pattern was 120 mJ/cm$^2$, to obtain a black composition, black coating film and a coating film having a line-and-space pattern. The regions of the obtained black coating film, at which the exposure energy was not less than 120 mJ/cm$^2$, had a thickness of 0.8 µm. Thus, it was confirmed that the minimum exposure energy required for the photo-curing was 120 mJ/cm$^2$. By observing the black coating film by holding it up to a fluorescent lamp, it was confirmed that the black coating film had a reddish black color. Further, the obtained coating films having a line-and-space pattern had a line-and-space pattern with a width of not less than 6 µm within the range of immersion time between 90 seconds and 130 seconds. That is, it was confirmed that the sensitivity was reduced in the case where acidic carbon black alone was used.

Example 10

(Preparation of Color Filter)

After preparing the polyimide precursor black film by the same method as in Example 1, the film was cooled and coated with a positive type photoresist, followed by drying at 90° C. to form a photoresist coating film. The resulting photoresist coating film was exposed through a photomask using a UV exposure machine. After exposure, the resultant was immersed in an alkaline developer to simultaneously carry out development of the photoresist and etching of the polyimide precursor black film, thereby forming apertural areas. After the etching, the photoresist layer which became no longer necessary was peeled off by methyl cellosolve acetate. The etched polyimide precursor black film was heated to 290° C. to carry out heat curing to convert the precursor to polyimide, thereby forming a resin black matrix. The resin black matrix had an OD value of 3.6 and a film thickness of 0.8 μm. The measured i-ray transmittance of the resin black matrix was 0.14%. From this value, the i-ray transmittance at an OD value of 2 is calculated to be 0.25%. Then red, green and blue pixels were formed on the resin black matrix. In a mixed solvent of γ-butyrolactone and N-methyl-2-pyrrolidone, pyromellitic dianhydride (0.5 molar equivalents), benzophenone tetracarboxylic acid dianhydride (0.49 molar equivalents), 4,4'-diaminodiphenyl ether (0.95 molar equivalents) and bis-3-(aminopropyl)tetramethylsiloxane (0.05 molar equivalents) were reacted to obtain a poly(amic-acid) solution (polymer concentration: 20% by weight). To 200 g aliquot of the thus obtained poly(amic-acid) solution, 186 g of γ-butyrolactone and 64 g of butyl cellosolve were added to obtain a poly(amic-acid) solution for forming pixels, having a polymer concentration of 10% by weight. Four grams of Pigment Red 177 (anthraquinone red), 40 g of γ-butyrolactone and 6 g of thyl cellosolve were subjected to dispersion treatment together with 100 g of glass beads using a homogenizer at 7000 rpm for 30 minutes, and the glass beads were removed by filtration, to obtain a dispersion liquid having a pigment content of 8% by weight. To 30 g of the pigment dispersion liquid, 30 g of the above-described poly(amic-acid) solution for forming pixels having a polymer concentration of 10% by weight was added to obtain a red paste.

The resin black matrix was coated with the red paste and the resultant was subjected to prebaking to form a polyimide precursor red film. By the same method as described above using a positive-type photoresist, red pixels were formed and heat curing was carried out at 290° C.

Using a homogenizer, 3.6 g of Pigment Green 36 (phthalocyanine green), 0.4 g of Pigment Yellow 83 (benzine yellow), 32 g of γ-butyrolactone and 4 g of butyl cellosolve were subjected to dispersion treatment together with 120 g of glass beads at 7000 rpm for 30 minutes, and the glass beads were removed by filtration, to obtain a dispersion liquid having a pigment content of 10% by weight. To 32 g of the pigment dispersion liquid, 30 g of the above-described poly(amic-acid) solution for forming pixels having a polymer concentration of 10% by weight was added to obtain a green color paste. Green pixels were formed in the same manner as in forming the pixels using the red paste, and heat curing was carried out at 290° C. Sixty grams of the poly(amic-acid) solution for forming pixels having a polymer concentration of 10% by weight, 2.8 g of Pigment Blue 15 (phthalocyanine blue), 30 g of N-methyl-2-pyrrolidone and 10 g of butyl cellosolve were subjected to dispersion treatment together with 150 g of glass beads using a homogenizer at 7000 rpm for 30 minutes, and the glass beads were removed by filtration, to obtain a blue color paste.

Blue pixels were formed by the same procedure as described above, and heat curing was carried out at 290° C., thereby preparing a color filter. The maximum height of the surface steps was 0.3 μm, and there was no need to improve the flatness by forming an over-coat film on the pixels. Then ITO film was formed on the pixels by sputtering method. The film-forming temperature was 230° C. As a result, ITO having a film thickness of 1400 angstroms and a surface resistance of 15Ω/□ was obtained, thereby completing the preparation of a color filter.

(Preparation of Liquid Crystal Display)

After washing the obtained color filter with a neutral detergent, an alignment layer made of a polyimide resin was applied by the printing method, and the resulting layer was heated with a hot plate at 250° C. for 10 minutes. The thickness of the layer was 0.07 μm. The color filter substrate was then subjected to rubbing process, and a sealing agent was applied by the dispense method, followed by heating the sealing agent with a hot plate at 90° C. for 10 minutes. On the other hand, a glass substrate on which TFT array was formed was washed in the same manner, and the alignment layer was applied and heated. Thereafter, ball spacers having a diameter of 5.5 μm were dispersed, and the resulting substrate was overlaid on the color filter substrate to which a sealing agent had been applied. The resultant was heated in an oven under pressure at 160° C. for 90 minutes to cure the sealing agent. The obtained cell was left to stand at 120° C. under a pressure of 13.3 Pa for 4 hours, and then in nitrogen for 0.5 hours, followed by injection of liquid crystal after placing the cell under vacuum again. The injection of liquid crystal was carried out by placing the cell in a chamber, reducing the pressure to 13.3 Pa at room temperature, immersing the liquid crystal injection port in the liquid crystal, and then restoring the pressure to normal pressure with nitrogen. After injection of the liquid crystal, the liquid crystal injection port was end-sealed with a UV curing resin. Then a polarizing plate was attached to the outer side of each of the two glass substrates. The obtained cell was made into a module to complete a liquid crystal display. The obtained liquid crystal display was observed and no defective display was found. Since the light shading effect of the resin black matrix was high, the contrast was good. One hundred liquid crystal displays were prepared in the same manner. As a result, since the adhesion of the resin black matrix was good, defects such as peeling off of the sealed portion during injection of liquid crystal did not occur at all.

Example 11

The same procedure as in Example 5 was carried out except that the light shading film obtained in Example 4 was used as the resin black matrix to prepare a color filter and a liquid crystal display. The resin black matrix used herein was prepared as follows: The black film comprising the acrylic resin was formed in the same manner as in Example 4 and cooled. The resulting film was exposed through a photomask using a UV exposure machine. After exposure, the resultant was immersed in an alkaline developer to carry out development, thereby forming apertural areas. Thereafter, the resultant was heated to 210° C. to carry out heat curing, thereby forming a resin black matrix. The thus obtained resin black matrix had an OD value of 3.6 and a film thickness of 0.8 μm. The measured i-ray transmittance of the resin black matrix was 0.17%. From this value, the i-ray transmittance at an OD value of 2 is calculated to be 0.3%. Thereafter, the process in Example 5 was followed to complete the preparation of a color filter. The maximum height of the surface steps of the color filter was 0.3 μm, and there was no need to improve the flatness by forming an over-coat on the pixels. Further, by the same method as in Example 5 using the thus obtained color filter, a liquid crystal display was prepared. The obtained liquid crystal display was observed and no defective display was found. Since the light shading effect of the resin black matrix was high, the contrast was good. One hundred liquid crystal displays were prepared in the same manner. As a result, since the adhesion of the resin black matrix was good, defects such as peeling off of the sealed portion during injection of liquid crystal did not occur at all.

Comparative Example 4

The same procedure as in Example 5 was carried out except that the light shading film obtained in Comparative Example 1 was used as a resin black matrix to prepare a color filter and a liquid crystal display. The obtained resin black matrix had an OD value of 3.3 and a film thickness of 0.8 μm. The maximum height of the surface steps of the obtained color filter was 0.3 μm, and there was no need to improve the flatness by forming an over-coat on the pixels. However, due to the insufficient light shading effect of the resin black matrix used for the liquid crystal display, defects such as leak of the backlight and malfunction of TFT occurred and the contrast was low.

Comparative Example 5

The same procedure as in Example 5 was carried out except that the light shading film obtained in Comparative Example 1 was used as the resin black matrix to prepare a color filter and a liquid crystal display. The obtained resin black matrix had an OD value of 3.5 and a film thickness of 0.85 μm. The maximum height of the surface steps of the obtained color filter was 0.35 μm. The liquid crystal display comprising the color filter obtained herein showed a defective display due to the disturbance of the alignment of liquid crystal resulted from the surface steps.

Example 12

(Preparation of Color Filter)

A resin black matrix was prepared using the black acrylic resin solution used in Example 4. After applying the black acrylic resin solution and prebaking, the resultant was cooled and exposed through a photomask using a UV exposure machine. After exposure, the resultant was immersed in an alkaline developer to carry out development and then heated to 220° C. to carry out heat curing, thereby forming a resin black matrix. The obtained resin black matrix had a film thickness of 0.8 μm and an OD value of 3.60. The measured i-ray transmittance of the resin black matrix was 0.17%. From this value, the i-ray transmittance at an OD value of 2 is calculated to be 0.3%. The edges of the patterns were observed to be vertical and of bluff shape. Then red, green and blue pixels were formed on the resin black matrix. The red resist, green resist and blue resist described below were used as materials. Pigment Red 177 (anthraquinone red) (12 g), acrylic copolymer solution (Cyclomer-P (registered trademark), ACA-250, manufactured by Daicel Chemical Industries, Ltd) (8.0 g), polymeric dispersant Solsperse (registered trademark) 24000 SC (manufactured by Avecia K.K.) (3.6 g) and methyl-3-methoxybutyl acetate (76.4 g) were subjected to dispersion treatment together with 100 g of glass beads using a homogenizer at 7000 rpm for 30 minutes, and the glass beads were removed by filtration, to obtain a dispersion liquid having a pigment content of 12%. To the pigment dispersion liquid (13.6 g), diluent varnish (16.4 g) prepared from pentaerythritol tetramethacrylate (0.9 g), a photoinitiator Irgacure (registered trademark) 369 (manufactured by Ciba Specialty Chemicals K.K.) (0.5 g) and 3-methyl-3-methoxybutyl acetate (37.8 g) was added to obtain a red resist.

Pigment Green 7 (phthalocyanine green) (10.8 g), Pigment Yellow 83 (benzine yellow) (1.2 g), acrylic copolymer solution A (Cyclomer-P (registered trademark), ACA-250, manufactured by Daicel Chemical Industries, Ltd) (8.0 g), polymeric dispersant Solsperse (registered trademark) 24000 SC (manufactured by Avecia K.K.) (3.6 g) and 3-methyl-3-methoxybutyl acetate (76.4 g) were subjected to dispersion treatment together with 100 g of glass beads using a homogenizer at 7000 rpm for 30 minutes, and the glass beads were removed by filtration, to obtain a dispersion liquid having a pigment content of 12%. To the pigment dispersion liquid (13.6 g), diluent varnish (16.4 g) prepared from pentaerythritol tetramethacrylate (0.9 g), a photoinitiator Irgacure (registered trademark) 369 (manufactured by Ciba Specialty Chemicals K.K.) (0.5 g) and 3-methyl-3-methoxybutyl acetate (37.8 g) was added to obtain a green resist.

Pigment Green 15 (phthalocyanine blue) (12.0 g), acrylic copolymer solution A (Cyclomer-P (registered trademark), ACA-250, manufactured by Daicel Chemical Industries, Ltd) (8.0 g), polymeric dispersant Solsperse (registered trademark) 24000 SC (manufactured by Avecia K.K.) (3.6 g) and 3-methyl-3-methoxybutyl acetate (76.4 g) were subjected to dispersion treatment together with 100 g of glass beads using a homogenizer at 7000 rpm for 30 minutes, and the glass beads were removed by filtration, to obtain a dispersion liquid having a pigment content of 12%. To the pigment dispersion liquid (13.6 g), diluent varnish (16.4 g) prepared from pentaerythritol tetramethacrylate (0.9 g), a photoinitiator Irgacure (registered trademark) 369 (manufactured by Ciba Specialty Chemicals K.K.) (0.5 g) and 3-methyl-3-methoxybutyl acetate (37.8 g) was added to obtain a blue resist.

The resin black matrix was coated with the red resist and the resultant was cooled, followed by exposure through a photomask using a UV exposure machine. After exposure, the resultant was immersed in an alkaline developer to carry out development, thereby forming apertural areas. Thereafter, the resultant was heated to 220° C. to carry out heat curing, thereby forming red pixels. The blue and blue pixels were formed in the same manner as the red pixels, thereby preparing a color filter. The maximum height of the surface steps was 0.26 μm, and there was no need to improve the flatness by forming an over-coat on the pixels. Then ITO film was formed on the pixels by sputtering method. The film-forming temperature was 230° C. As a result, ITO having a film thickness of 1400 angstroms and a surface resistance of 15Ω/□ was obtained, thereby completing the preparation of a color filter. Further, by the same method as in Example 5 using the thus obtained color filter, a liquid crystal display was prepared. The obtained liquid crystal display was observed and no defective display was found. Since the light shading effect of the resin black matrix was high, the contrast was good. One hundred liquid crystal displays were prepared in the same manner. As a result, since the adhesion of the resin black matrix was good, defects such as peeling off of the sealed portion during injection of liquid crystal did not occur at all.

INDUSTRIAL APPLICABILITY

Since a resin black matrix which is thin, which has a high OD value and which is highly adhesive is obtained by using the black coating composition according to the present invention, a color filter having no over-coat, which could be hitherto attained only by using a metal thin film black matrix, may be attained by using a resin black matrix. By virtue of the present invention, the necessity to form an over-coat is eliminated, so that the present invention may greatly contribute to the prevention of decrease in the yield and to cost reduction in the production of color filters.

The invention claimed is:

1. A black composition comprising as indispensable components titanium nitride oxide particles having a primary particle average diameter of 40 nm to 50 nm, an acrylic resin, carbon black and a solvent, wherein a weight ratio of the titanium nitride oxide to the acrylic resin is within the range of between 75/25 to 60/40; wherein X-ray intensity ratios $R_1$ and $R_2$ represented by the Equations (1) and (2) below, respectively, satisfy the relationships represented by Formulae (3) and (4) below:

$$R_1 = I_3/\{I_3 + 1.8(I_1 + 1.8I_2)\} \quad (1)$$

$$R_2 = I_2/I_1 \quad (2)$$

$$0.70 < R_1 \leqq 0.82 \quad (3)$$

$$0.85 < R_2 < 1.80 \quad (4)$$

wherein $I_1$ represents the maximum diffraction intensity of the titanium nitride oxide when the angle of diffraction 2θ, determined by using CuKα line as the X-ray source, is 25° to 26°, $I_2$ represents the maximum diffraction intensity of the titanium nitride oxide when the angle of diffraction 2θ is 27° to 28°, $I_3$ represents the maximum diffraction intensity of the titanium nitride oxide when the angle of diffraction 2θ is 36° to 38°, and wherein a black coating film obtained from said black composition has an optical density (OD value) of not less than 4.4 per 1 μm of film thickness, wherein the transmittance of i-ray ultraviolet light through a resin black matrix obtained from said black composition is more than 0.2% when the OD value is 2.0, and wherein the minimum exposure energy required for photocuring is not more than 60 mJ/cm².

2. The black composition according to claim 1, wherein said X-ray intensity ratio $R_1$ is not less than 0.80.

3. The black composition according to claim 1, wherein said solvent has a boiling point of 120° C. to 180° C., and a viscosity of 3 mPa·s to 10 mPa·s.

4. The black composition according to claim 1, further comprising an organosilane hydrolysis condensate.

5. The black composition according to claim 1, further comprising a compound having a siloxane bond and a carbon-carbon double bond in a single molecule and having no silanol group.

6. The black composition according to claim 5, wherein said compound having a siloxane bond and a carbon-carbon double bond in a single molecule and having no silanol group has the structure represented by the following Formula (7):

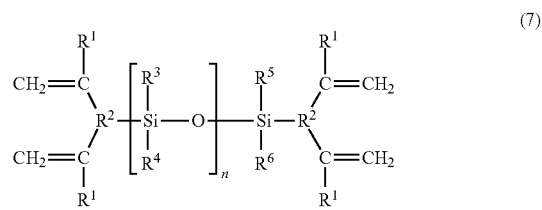

wherein each $R^1$ independently represents hydrogen or alkyl group; each $R^2$ independently represents an organic group containing amide bond, imide bond, ester bond or urethane bond; $R^3$ to $R^6$ independently represent alkyl group; and n represents an integer of 1 to 3.

7. A resin black matrix obtained by exposing and developing a black coating film obtained by coating said black composition according to claim 1 on a substrate.

8. A color filter for liquid crystal displays, which color filter comprises said resin black matrix according to claim 7.

9. A liquid crystal display comprising said color filter for liquid crystal displays, according to claim 8.

10. The black composition according to claim 1, further comprising a photopolymerizable monomer and a photoinitiator.

* * * * *